United States Patent
Haas et al.

(10) Patent No.: US 6,778,976 B2
(45) Date of Patent: Aug. 17, 2004

(54) SELECTIVITY ESTIMATION FOR PROCESSING SQL QUERIES CONTAINING HAVING CLAUSES

(75) Inventors: Peter J. Haas, San Jose, CA (US); John E. Lumby, Toronto (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 09/757,434

(22) Filed: Jan. 10, 2001

(65) Prior Publication Data

US 2001/0037327 A1 Nov. 1, 2001

(30) Foreign Application Priority Data

Apr. 28, 2000 (CA) .............................. 2306928

(51) Int. Cl.⁷ .............................. G06F 17/30
(52) U.S. Cl. ............ 707/2; 707/2; 707/3; 707/4; 707/100
(58) Field of Search ............... 707/1–10, 201, 707/202

(56) References Cited

U.S. PATENT DOCUMENTS

| | | | | |
|---|---|---|---|---|
| 5,469,568 A | * | 11/1995 | Schiefer et al. ................ | 707/2 |
| 5,857,180 A | * | 1/1999 | Hallmark et al. .............. | 707/2 |
| 6,012,054 A | * | 1/2000 | Seputis ........................... | 707/3 |
| 6,021,405 A | * | 2/2000 | Celis et al. ..................... | 707/2 |
| 6,138,112 A | * | 10/2000 | Slutz .............................. | 707/2 |
| 6,263,345 B1 | * | 7/2001 | Farrar et al. ............. | 707/104.1 |
| 6,298,342 B1 | * | 10/2001 | Graefe et al. ................. | 707/4 |
| 6,311,181 B1 | * | 10/2001 | Lee et al. ...................... | 707/2 |
| 6,330,552 B1 | * | 12/2001 | Farrar et al. ................ | 705/400 |
| 6,351,742 B1 | * | 2/2002 | Agarwal et al. ............... | 707/3 |
| 6,353,826 B1 | * | 3/2002 | Seputis .......................... | 707/2 |
| 6,370,522 B1 | * | 4/2002 | Agarwal et al. ............... | 707/2 |
| 6,519,604 B1 | * | 2/2003 | Acharya et al. ............. | 707/102 |
| 6,529,901 B1 | * | 3/2003 | Chaudhuri et al. ............ | 707/3 |
| 6,567,806 B1 | * | 5/2003 | Tsuchida et al. ............... | 707/2 |

OTHER PUBLICATIONS

"Data Cube: A Relational Aggregation Operator Generalizing Group–By, Cross–Tab, and Sub–Totals", Jim Gray, Adam Boswort Andrew and Hamid Pirahesh—1996—IEEE (pp: 152–159).*

"Aggregate Predicate Support in DBMS"—Apostol (Paul) Natsev, Gene Y. C. Fuh, Weidong Chen, Chi–Huang Chiu and Jeffrey S. Vitter, 2001—Australian Computer Society, Inc. (pps: 111–120).*

"On Saying "Enough Already!" in SQL"—Michael J. Carey and Donal Kossmann—1997—ACM (pps: 219–230).*

"Bottom–Up Computation of Sparse and Iceberg CUBES"—Kevin Beyer and Raghu Ramakrishnan 1999—ACM (pps: 359–370.*

* cited by examiner

*Primary Examiner*—Jean M. Corrielus
*Assistant Examiner*—Anh Ly
(74) *Attorney, Agent, or Firm*—Sawyer Law Group LLP

(57) ABSTRACT

The estimate of the selectivity of a HAVING clause in an SQL query is carried out within a specified time constraint by determining a selectivity estimate for each member in a sample set of group sizes for the HAVING clause using a probabilistic model based on an assumed value distribution. The selectivity estimates for the groups in the sample set are used to interpolate estimates for all possible group sizes and the estimates are combined based on an assumed known group size distribution to provide an estimation of the selectivity for the HAVING clause. Different selectivity estimating approaches are used for each group size based on available time for estimating and on the estimated time to complete the estimate using different techniques.

17 Claims, 1 Drawing Sheet

SELECTIVITY ESTIMATION FOR PROCESSING SQL QUERIES CONTAINING HAVING CLAUSES

FIELD OF THE INVENTION

The present invention is directed to an improvement in computing systems and in particular to selectivity estimation for processing SQL queries containing HAVING clauses.

BACKGROUND

In a relational database a user views the data as a collection of tables. A user expresses a query against the database in a language such as SQL. The data in a relational database is maintained by, and operations on the data are carried out by way of, a relational database management system (RDBMS), such as the DB2 Universal Database™. Where a user defines a query against the database, certain RDBMSs, such as DB2 Universal Database™, invoke a component called an optimizer to choose a plan to access the data and produce the result. As part of the plan selection process, estimates of the size of the result at various stages in the plan are often utilized by the optimizer to choose a low cost plan. These are called selectivity estimates.

One particular type of SQL predicate which a user may specify in formulating a query is the HAVING clause. This refers not to individual rows of tables, but to groups of rows. A HAVING clause is a predicate that is applied to a grouping of rows and determines whether the group as a whole shall be included in or excluded from the query result or temporary table.

The "selectivity" of a HAVING clause is the fraction of the groups that satisfy the clause. Good a priori estimates of the selectivity of a HAVING clause are beneficial in choosing a lowest cost query plan, or one with cost close to the lowest. Such estimates are hard to obtain. Usually, the only information on which such estimates can be based is a small set of summary statistics about the data that is maintained in the system catalog by the RDBMS. Also, the time to calculate such estimates must not be exceed the time allowable for a given context in which the HAVING clause is being evaluated. In the prior art, there are known techniques for determining selectivity of certain queries (see, for example, U.S. Pat. No. 6,012,054, Seputis, describing the use of histograms to estimate selectivities). However, such techniques do not lend themselves to effectively estimating selectivity for a query including a HAVING clause and typically RDBMS optimizers assign an arbitrary constant value to the estimated selectivity for the HAVING clause, for example, 0.33333. Such a crude estimate is often vastly different from the actual selectivity and can lead to a bad choice of plan where the estimate is inaccurate.

It is therefore desirable to estimate the selectivity of a having clause in an SQL query in an efficient manner to permit an appropriate low-cost query plan to be chosen by the optimizer in an RDBMS.

SUMMARY OF THE INVENTION

According to one aspect of the present invention, there is provided an improved estimation of the selectivity of a HAVING clause in an SQL query.

According to another aspect of the present invention, there is provided a method for estimating the selectivity of a HAVING clause in an SQL query on a data table having data values, within a specified time constraint, the possible number of groups for the HAVING clause being assumed to have a known distribution between a specified minimum group size and a specified maximum group size, the distribution of the data values having a specified value distribution between a specified minimum data value and a specified maximum data value, the method including the steps of:

calculating a selectivity estimate for the HAVING clause for each member in a selected sample set of group sizes using a probabilistic model based on the specified value distribution, and using the selectivity estimate for the members of the sample set of group sizes to define the selectivity of the HAVING clause to be a weighted estimate calculated to represent the selectivity for the possible number of groups for the HAVING clause.

According to another aspect of the present invention, there is provided the above method in which the calculation of a selectivity estimate for the HAVING clause for each member in a selected sample set of group sizes includes the steps of selecting between the estimation techniques of a fill convolution, a scaled convolution, a normal approximation, or a combination of those estimation techniques and then carrying out the calculation of the selectivity estimate using the selected estimation technique.

According to another aspect of the present invention, there is provided the above method in which the selection between the estimation techniques is determined by comparing a set of predicted processing times for each of a full convolution and a scaled convolution, for differing scaling factors, with the specified time constraint and the selection being dependent on the existence of a scaling factor which provides for processing of the estimation within the specified time constraint while maintaining the accuracy of the convoluted estimated selectivity within a specified accuracy.

According to another aspect of the present invention, there is provided the above method in which the weighted estimate is calculated using interpolation based on the known distribution of group sizes to determine selectivity for group sizes not contained in the sample set of group sizes.

According to another aspect of the present invention, there is provided a program storage device readable by a machine, tangibly embodying a program of instructions executable by the machine to perform the above method steps for estimating the selectivity of an SQL HAVING clause in a query.

According to another aspect of the present invention, there is a relational database management system including a selectivity estimation component for estimating, within a specified time constraint, the selectivity of a HAVING clause in an SQL query on a data table having data values, the possible number of groups for the HAVING clause being assumed to have a known distribution between a specified minimum group size and a specified maximum group size, the distribution of the data values having a specified value distribution between a specified minimum data value and a specified maximum data value, the selectivity estimation component including:

a member estimation component for determining an estimated selectivity for the HAVING clause for each member in a selected sample set of group sizes using a probabilistic model based on the specified value distribution, and a combination component for defining the selectivity of the HAVING clause using the selectivity estimate for the members of the sample set of group sizes to calculate a weighted estimate representing the selectivity for the possible number of groups for the HAVING clause.

According to another aspect of the present invention, there is provided the above relational database management system in which the member estimation component includes a selection component for selecting between the estimation techniques of a full convolution, a scaled convolution, a normal approximation, or a combination of those estimation techniques and further includes an execution component for carrying out the calculation of the selectivity estimate using the selected estimation technique.

According to another aspect of the present invention, there is provided the above relational database management system in which the selection component includes a comparator component for comparing a set of predicted processing times for each of a full convolution and a scaled convolution, for differing scaling factors, with the specified time constraint and the selection between the techniques being dependent on the existence of a scaling factor which provides for processing of the estimation within the specified time constraint while maintaining the accuracy of the convoluted estimated selectivity within a specified accuracy.

According to another aspect of the present invention, there is provided the above relational database management system in which the combination component includes an interpolation component for calculating the weighted estimate using interpolation based on the known distribution of group sizes to determine selectivity for group sizes not contained in the sample set of group sizes.

Advantages of the present invention include permitting a low-cost access plan to be chosen by the optimizer in an RDBMS carrying out an SQL query on a data table by estimating the selectivity of a HAVING clause in the query.

BRIEF DESCRIPTION OF THE DRAWINGS

The preferred embodiment of the invention is shown in the drawing, wherein.

Figure 1:
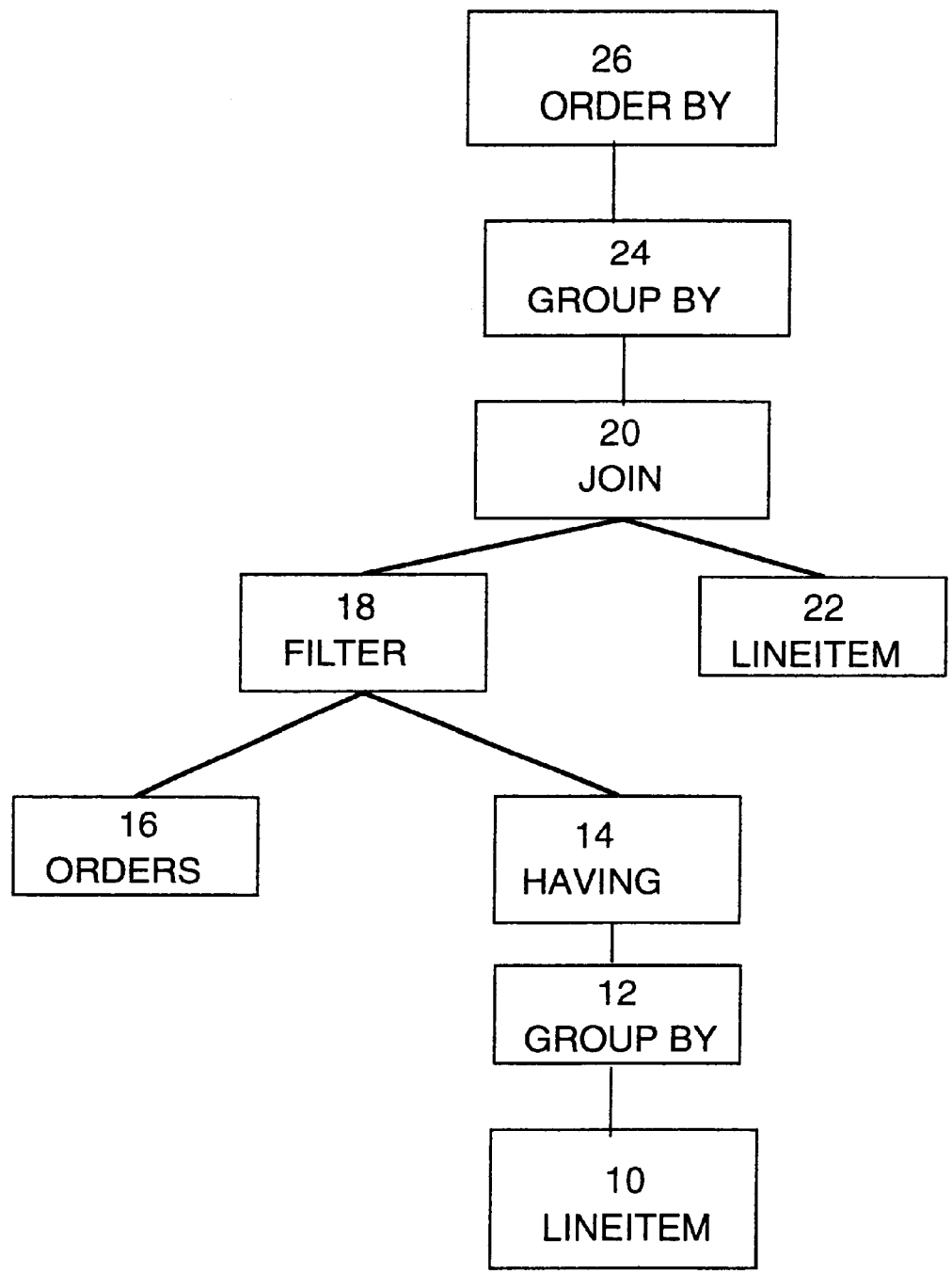
FIG. 1 is a flowchart illustrating the flow of data in an example query subject to the selectivity estimation of the preferred embodiment of the invention.

In the drawing, the preferred embodiment of the invention is illustrated by way of example. It is to be expressly understood that the description and drawing are only for the purpose of illustration and as an aid to understanding, and are not intended as a definition of the limits of the invention.

DETAILED DESCRIPTION

The context for the selectivity estimation of the preferred embodiment of the invention is provided by an example query in SQL. The query of Example 1 will, in an RDBMS such as the DB2 Universal Database™, result in a data flow such as that shown in FIG. 1.

SELECT ORDERS.ORDERDATE, SUM(LINEITEM.SELLING_PRICE)
FROM LINEITEM,ORDERS
   WHERE ORDERS.ORDERDATE>'Apr. 20, 1999'
   AND ORDERS.ORDERKEY=LINEITEM.ORDERKEY
   AND ORDERS.ORDERKEY IN
     (SELECT LINEITEM.ORDERKEY FROM LINEITEM GROUP BY LINEITEM.ORDERKEY HAVING SUM(LINEITEM.SELLING_PRICE)>2000)
GROUP BY ORDERS.ORDERDATE
ORDER BY SUM(LINEITEM.SELLING_PRICE)

EXAMPLE 1

The query in Example 1 relates to data tables ORDERS and LINEITEM. This query requests a summary of days since Apr. 20, 1999 on which the total selling price of all orders exceeds 2000. The summary is at the date level (all line items of all selected orders placed on a particular day are to be grouped together). The summary is to be returned in the order of the total selling price of orders on that day.

The query itself does not specify how the RDBMS is to access the LINEITEM and ORDERS tables to obtain the summary sought. The optimizer in the RDBMS will determine a plan to access the data so as to efficiently provide the summary for the user. Here the HAVING clause is applied to a subquery, which is itself a predicate of the main query. This subquery containing the HAVING clause returns all orders whose total selling price is over 2000.

FIG. 1 shows the data flow (from bottom to top of the drawing) for an RDBMS processing the query of Example 1. The optimizer in an RDBMS will make choices in the access plan based on estimates of the results of the different steps shown in the flowchart of FIG. 1. In FIG. 1, box 10 represents access to the LINEITEM table. Box 12 represents the grouping of values according to LINEITEM.ORDERKEY and the SUM of the selling price being calculated for each group. Box 14 shows the application of the clause HAVING SUM(SELLING_PRICE)>2000. Box 16 represents access to the ORDERS table and the filtering of rows based on the ORDERDATE predicate. Box 18 reflects a filter for rows that satisfy the IN subquery predicate. The cardinality estimates depend on the estimates obtained for the HAVING clause.

Box 20 is where the join is done between the relevant rows from the ORDERS table and the LINEITEM table (box 22). The join is done based on the ORDERKEY. The cost of this step and the choice of the join methodology will depend on the selectivity estimated by the RDBMS optimizer. The performance of the join, and in a more complex query, the rest of the plan above could be affected to a significant extent by the selectivity estimated for the HAVING clause.

Box 24 reflects the step where the values are grouped according to ORDERS.ORDERDATE and the SUM of SELLING_PRICE is computed for each group. Box 26 shows the final step of sorting to satisfy the ORDER BY clause in the query of Example 1.

In the approach of the prior art, a strategy is to use a constant selectivity estimate such as 0.33333 for the HAVING clause in Example 1. However, such an estimate will likely result in a poor choice of method for applying or joining the result of the subquery to the ORDERS table. There are many different ways of performing this operation, including commonly used join methods such as Nested Loop Join, Hash Join, Sort-Merge Join, and other methods involving inverting the operation so that the subquery result is materialized once and then for each row the ORDERS table is scanned searching for the matching row. Some of these methods are very similar to each other in operation but others may be very different and have very different costs. A poor choice of plan by the RDBMS optimizer could cause severe degradation of query performance. The preferred embodiment, by providing an optimizer with an estimated selectivity permits an improved choice of access plan.

The preferred embodiment uses minimum and maximum sizes for group size which may be estimated from catalog statistics maintained by the RDBMS. The preferred embodiment assumes a probabilistic model in which the group size is uniformly distributed between those minimum and maximum values. The preferred embodiment also works on the assumption that the value of each data item is uniformly distributed between minimum and maximum values (again obtained from the system catalog). The preferred embodiment approach obtains selectivity estimates for each possible group size and then combines these estimates to produce the final selectivity estimate.

The preferred embodiment "samples" certain of the group sizes, that is, explicitly computes a selectivity estimate; selectivity estimates for the other group sizes are evaluated by interpolation from the explicitly calculated values. For each group size that is sampled, one of several estimation methods may be used. These include a novel scaled convolution method and a normal approximation method.

The preferred embodiment automatically selects the group sizes to be sampled and the estimation method to be used for each sampled group size based on formulae that estimate the cost of computing the selectivity estimate, together with an upper limit on the time allowed for calculation of the final combined selectivity estimate. This permits the preferred embodiment to perform the estimation of selectivity within an upper time appropriate for the optimization.

The upper time limit can depend upon multiple factors, including:

optimization level set by the user
 static or dynamic compilation mode
 whether the output of the query portion that contains the HAVING CLAUSE will be the input to a further portion of the query The description of the preferred embodiment uses as an example the selectivity estimation for a clause of the form HAVING SUM (attribute)>hurdle.

The technique of the preferred embodiment may be similarly applied to other relations such as less than (<), less than and equal to (<=), equal to (=) and greater than and equal to (>=). Other aggregation operators (COUNT and AVERAGE) are also able to use the preferred embodiment approach to selectivity estimation and the application of the preferred embodiment to such operators is set out below.

According to the preferred embodiment, estimation of selectivity is described in terms of a fixed group size g (g>0). The final selectivity estimate for the HAVING clause is computed by averaging selectivity estimates (or interpolated selectivity values) computed for values of g ranging from the minimum value read from the catalog tables (gmin) to the maximum (gmax).

The preferred embodiment's estimate for the selectivity of the HAVING clause can be expressed as:

selectivity=AVERAGE[$g$=gmin to gmax]$P$(hurdle, $g$)

In this formulation, P(hurdle, g) is the probability that the SUM of a group of size g items exceeds the hurdle. Taking into consideration the assumptions for the estimates set out above, the following defines P(hurdle, g) for a fixed value of g:

$P$(hurdle, $g$)=Prob$\{X1+X2+ \ldots +Xg$>hurdle$\}$

In this statement, X1, X2, . . . , Xg are independent and identically distributed integer-valued random variables taking values in a specified range [vmin, vmax]. As will be apparent, the substitution of <, <=, >=, or =, for > in the above statement may be carried out where the system of the preferred embodiment is estimating the selectivity of a HAVING clause which has a relation other than the greater than relation used in the example presented in this description.

The preferred embodiment provides a mechanism for estimating the selectivity of the HAVING clause for use in the optimizer of an RDBMS. For this reason, the operation of the preferred embodiment is subject to time constraints. There are several different techniques which are selected from by the preferred embodiment system in carrying out the calculation of the probability set out above. The selection of the different techniques is dependent on the time available for calculation of the selectivity estimate by determining P(hurdle, g) as defined above.

Where possible, the preferred embodiment utilizes a known convolution method for calculating the P(hurdle, g) value exactly. If there is not sufficient time to permit such an approach, the preferred embodiment uses an integer scale estimation approach, described in more detail below. A further approach that the preferred embodiment may select to utilize is a known normal approximation method. The available time for the calculation of the probability is determined in a manner described in more detail below. The convolution method for calculating P(hurdle, g) is known in the art. In the context of the value for P(hurdle, g), the convolution method takes the following form:

A value $r(g,k)$ is defined to be Prob $\{X1+X2+ \ldots +Xg=k\}$

The following recursion is then used:

$r(1,k)$=[$1/(v$max$-v$min$+1)$ if $v$min$<=k<=v$max, and 0 otherwise]

for k=vmin, vmin+1, . . . , vmax, and $r(g, k)=r(g-1, $ low$)*r(1, k-$low$)+r(g-1, $ low$+1)*r(1, k-$low$-1)$
 $+ \ldots +r(g-1,$high$)*r(1, k-$high$)$ for g=2,3, . . . , gmax and k=g*vmin, g*vmin+1, . . . , g*vmax, where low=max(k−vmax, (g−1)*vmin) and high=min (k−vmin, (g−1)*vmax).

The quantity P(hurdle, g) is then computed by summing r(g, k) over all values of k that exceed hurdle. If the relation is greater than (>), then the sum is taken over all values of k that are less than hurdle. Similarly with the other relations referred to above. As discussed above, it is to be expected that it will not be possible to use the convolution method to calculate the selectivity estimate in all cases. Where convolution, which provides the exact value of P(hurdle, g) as defined above, is not available, the preferred embodiment selects methods for approximating the value of P(hurdle, g).

One method available for use by the preferred embodiment to carry out the approximate computation of P(hurdle, g) is to approximate the probability by an scale factor method as set out below. In this method a value Q(hurdle, g) will be calculated as follows:

$Q$(hurdle, $g$)=Prob$\{Y1+Y2+ \ldots +Yg$>hurdle$/s\}$ where s is an integer scale-factor selected to keep the cost of computing the selectivity below the specified time budget, and Y1, Y2, . . . , Yg are independent and identically distributed integer-valued random variables taking values in the range {vmin/s, vmax/s}. The quantity Q(hurdle,g) is then computed exactly, using a convolution method similar to that set out above. The value of Q(hurdle, g) is then used as an approximation for P(hurdle, g).

The second method used by the preferred embodiment for approximately computing P(hurdle,g) is to use a well-known normal approximation to the distribution of the sum of g independent and identically distributed random variables.

For the example set out in the preferred embodiment description, the approximate expression is $$P(\text{hurdle}.g) \approx N((\text{hurdle} - g*\text{mu})/(\text{sigma}*\text{sqrt}(g))),$$

where mu=(vmax+vmin)/2, sigma=sqrt{(1/12)*(vmax−vmin+2)*(vmax−vmin)} and N(x) is the probability that a standardized (mean 0, variance 1) normal random variable exceeds the value x.

Any of several well-known numerical procedures for evaluating the function N may be used.

For the case of the AVERAGE aggregation operator, the formula for the selectivity is $$P(\text{hurdle}.g) = \text{Prob}\{X1+X2+\ldots+Xg > (g*\text{hurdle})\}$$

Where such a HAVING clause is to be evaluated, the preferred embodiment will carry out the same steps set out above, but will use the above expression for P(hurdle, g). For the case of the COUNT operator, the formula for the selectivity is $$P(\text{hurdle}, g) = \text{Prob}(g > \text{hurdle})$$

and the preferred embodiment uses the uniform probability distribution for g directly, as follows:

P(hurdle, g)=0 if gmax<=hurdle

P(hurdle, g)=(gmax−hurdle)/gmax if gmax>hurdle

The approach of the preferred embodiment is based upon empirical measurements of the time taken to perform the different selectivity-estimation computations on different machines with different values of parameters. The preferred embodiment relies on functions defined for the selectivity estimation computations developed using standard curve-fitting techniques.

The preferred embodiment selects between the different ways to obtain a value to use for P(hurdle, g) based on the time constraints imposed by the RDBMS. The preferred embodiment defines a three-dimensional array of time limits for each combination of values assigned for the three factors: optimization level, compilation mode and context within the SQL query. In the preferred embodiment these values are heuristically determined and are based on the collective experience of performance personnel and service personnel relating to user comments as to the time acceptable to a user for carrying out query optimization. The values in the matrix are available to the preferred embodiment and the entry in the matrix corresponding to the query processing in question is selected as determining the appropriate time limit for the selectivity estimation.

In more detail, the procedure followed by the preferred embodiment in estimating selectivity is as follow: First the preferred embodiment carries out an estimate of the time required for exact computation of the selectivity estimates for all gmax group sizes using the convolution method with scale-factor s=1. If this estimated time exceeds the budgeted time limit, as retrieved from the three-dimensional matrix, then the preferred embodiment computes the minimum value of the scale-factor s required to complete all gmax convolutions within the time limit.

As will be appreciated, different scale factors will have associated different accuracies of estimation. Where a scale factor is large, there will be a potentially large loss of accuracy. For the assumptions made regarding the data distributions, the loss of accuracy may be calculated for different scale factors using techniques known to those skilled in the art. In the preferred embodiment, a loss of accuracy of greater than about 2% is considered unacceptable.

If carrying out the scaled-convolution using the scale-factor value s determined to be complete within the time permitted would cause excessive loss of accuracy, then the preferred embodiment calculates G, the number of group sizes for which the preferred embodiment can perform G convolutions using the maximum scaling that still produces sufficient accuracy. The preferred embodiment then chooses the value G+1 as the number of samples to be taken. The G+1 group sizes to be samples are, roughly 1, (gmax/G), 2*(gmax/G), . . . , gmax.

The final step is to partition the set of sampled group sizes into two ranges—a lower range in which the convolution method is used and an upper range in which the normal approximation is used. This general approach includes the case where an exact convolution determination is made (s=1 and there is no normal estimation), where a scaled-convolution only is used (s>1 and there is no normal estimation), where a scaled-convolution is used for group sizes 1, 2, . . . , G and there is a normal estimation for group sizes G+1, G=2, . . . , gmax (s>1 and a value of G is found), and where there is no convolution possible and the sampled normal calculation alone is used (no s value is found).

To estimate the selectivity for non-sampled group sizes, the preferred embodiment uses linear interpolation. This leads to a formula for the final estimate that is a weighted estimate of the selectivity for the sampled group size. In particular the formula may be set out as follows:

If gmin=1 and the sampled group sizes are 1, 1+k, 1+2*k, . . . , 1+(n−1)*k and the corresponding group selectivity estimates are F(1), F(1+k), . . . , where F(g)=P(hurdle, g), and where m−gmax is defined as the number of possible group sizes, then the selectivity estimate may be set out as follows:

FINAL ESTIMATE=$((k+1)/(2*m))*F(1)+(k/m)*F(1+k)+(k/m)*F(1+2+*K)+\ldots+(k/m)*F(1+(n-2)*k+((K+1)/(2*m))*F(1+(n-1)*k)$ This estimate provides a selectivity value for use in the optimizer for the RDBMS in choosing an access plan for a query including a HAVING clause. The value is estimated in a manner that is within determined time constraints and permits the access plan to include better choices than is possible where the selectivity estimate for the HAVING clause is a fixed number.

Although a preferred embodiment of the present invention has been described here in detail, it will be appreciated by those skilled in the art, that variations may be made thereto. Such variations may be made without departing from the spirit of the invention or the scope of the appended claims.

What is claimed is:

1. A method for estimating a selectivity of a HAVING clause in an SQL query, the method comprising the steps of:
   a) calculating a selectivity estimate for the HAVING clause for each member in a selected sample set of group sizes; and
   b) using the selectivity estimate for the members of the sample set of group sizes to define the selectivity of the HAVING clause to be a weighted estimate calculated to represent the selectivity for the possible number of groups for the HAVING clause, wherein the possible number of groups for the HAVING clause is assumed to have a known distribution between a specified minimum group size and a specified maximum group size and a distribution of data values having a specified value distribution between a specified minimum data value and a specified maximum data value.

2. The method of claim 1 wherein the selectivity estimate for the HAVING clause is calculated using a probabilistic model based on a specified value distribution.

3. The method of claim 2 wherein step a) further comprises:
   a1) selecting between a plurality of estimation techniques wherein the plurality of estimation techniques comprise a full convolution, a scaled convolution, a normal approximation, or a combination thereof; and
   a2) using the selected estimation technique to carry out the calculation of the selectivity estimate.

4. The method of claim 3 wherein step a1) further comprises:
   a1i) comparing a set of predicted processing times for each of a full convolution and a scaled convolution, for differing scaling factors, with the specified time constraint, the selection being dependent the existence of a scaling factor which provides for processing of the estimation within the specified tie constraint while maintaining the accuracy of the convoluted estimated selectivity within a specified accuracy.

5. The method of claim 1 wherein the weighted estimate is calculated using interpolation based on the known distribution of group sizes to determine selectivity for group sizes not contained in the sample set of group sizes.

6. A system for estimating a selectivity of a HAVING clause in an SQL query, the system comprising:
   a member estimation component for calculating a selectivity estimate for the HAVING clause for each member in a selected sample set of group sizes; and
   means for using the selectivity estimate for the members of the sample set of group sizes to define the selectivity of the HAVING clause to be a weighted estimate calculated to represent the selectivity for the possible number of groups for the HAVING clause, wherein the possible number of groups for the HAVING clause is assumed to have a known distribution between a specified minimum group size and a specified maximum group size and a distribution of the data values having a specified value distribution between a specified minimum data value and a specified maximum data value.

7. The system of claim 6 wherein the selectivity estimate for the HAVING clause is calculated using a probabilistic model based on a specified value distribution.

8. The system of claim 7 wherein the member estimation component further comprises:
   means for selecting between a plurality of estimation techniques wherein the plurality of estimation techniques comprise a full convolution, a scaled convolution, a normal approximation, or a combination thereof; and
   means for using the selected estimation technique to carry out the calculation of the selectivity estimate.

9. The system of claim 8 wherein the means for selecting between a plurality of estimation techniques further comprises:
   means for comparing a set of predicted processing times for each of a full convolution and a scaled convolution, for differing scaling factors, with the specified time constraint, the selection being dependent the existence of a scaling factor which provides for processing of the estimation within the specified tie constraint while maintaining the accuracy of the convoluted estimated selectivity within a specified accuracy.

10. The system of claim 6 wherein the weighted estimate is calculated using interpolation based on the known distribution of group sizes to determine selectivity for group sizes not contained in the sample set of group sizes.

11. A computer readable medium containing program instructions for estimating a selectivity of a HAVING clause in an SQL query, the program instructions comprising the steps of:
    a) calculating a selectivity estimate for the HAVING clause for each member in a selected sample set of group sizes; and
    b) using the selectivity estimate for the members of the sample set of group sizes to define the selectivity of the HAVING clause to be a weighted estimate calculated to represent the selectivity for the possible number of groups for the HAVING clause, wherein the possible number of groups for the HAVING clause is assumed to have a known distribution between a specified minimum group size and a specified maximum group size and a distribution of the data values having a specified value distribution between a specified minimum data value and a specified maximum data value.

12. The computer readable medium of claim 11 wherein the selectivity estimate for the HAVING clause is calculated using a probabilistic model based on a specified value distribution.

13. The computer readable medium of claim 12 wherein step a) further comprises:
    a1) selecting between a plurality of estimation techniques wherein the plurality of estimation techniques comprise a full convolution, a scaled convolution, a normal approximation, or a combination thereof; and
    a2) using the selected estimation technique to carry out the calculation of the selectivity estimate.

14. The computer readable medium of claim 13 wherein step a1) further comprises:
    a1i) comparing a set of predicted processing times for each of a full convolution and a scaled convolution, for differing scaling factors, with the specified time constraint, the selection being dependent the existence of a scaling factor which provides for processing of the estimation within the specified tie constraint while maintaining the accuracy of the convoluted estimated selectivity within a specified accuracy.

15. The computer readable medium of claim 11 wherein the weighted estimate is calculated using interpolation based on the known distribution of group sizes to determine selectivity for group sizes not contained in the sample set of group sizes.

16. A method for estimating a selectivity of a HAVING clause in an SQL query, the method comprising the steps of:
    a) selecting a set of group sizes from a plurality of group sizes ranging from a minimum group size to a maximum group size;
    b) calculating a selectivity estimate for the HAVING clause for each group size in the selected set of group sizes; and
    c) using the selectivity estimate for each group size in the selected set of group sizes to define the selectivity of the HAVING clause to be a weighted estimate representing the selectivity for the possible number of groups for the HAVING clause, wherein the possible number of groups for the HAVING clause is assumed to have a known distribution between a specified minimum group size and a specified maximum group size and a distribution of the data values having specified value distribution between a specified minimum data value and a specified maximum data value.

17. A computer readable medium containing program instructions for estimating a selectivity of a HAVING clause in an SQL query, the program instructions for:
 a) selecting a set of group sizes from a plurality of group sizes ranging from a minimum group size to a maximum group size;
 b) calculating a selectivity estimate for the HAVING clause for each group size in the selected set of group sizes; and
 c) using the selectivity estimate for each group size in the selected set of group sizes to define the selectivity of the HAVING clause to be a weighted estimate representing the selectivity for the possible number of groups for the HAVING clause, wherein the possible number of groups for the HAVING clause is assumed to have a know distribution between a specified minimum group size and a specified maximum group size and a distribution of the data values having a specified value distribution between a specified minimum data value and a specified maximum data value.

* * * * *